3,314,778
METHOD OF PREPARING SLOW RELEASE FERTILIZERS CONTAINING A UREA-PARAFFIN WAX ADDUCT

Robert H. Campbell, Brookhaven, and Wesley R. Cherry, Prospect Park, Pa., assignors to Sun Oil Company, Philadelphia, Pa., a corporation of New Jersey
No Drawing. Filed July 14, 1964, Ser. No. 382,671
7 Claims. (Cl. 71—28)

This invention is a method of preparing slow release fertilizers comprising a dispersion of a urea-paraffin wax adduct in wax. More particularly the invention is a method of preparing such a fertilizer using as the starting material a slow release fertilizer comprising a dispersion of urea in wax.

It is known that discrete particles comprising a dispersion of urea in wax are a slow release fertilizer. It is also known that discrete particles comprising a dispersion of a urea-paraffin wax adduct in wax are a slow release fertilizer, such as fertilizer being disclosed and claimed in copending application Ser. No. 308,087, filed Sept. 11, 1963. An advantage of the adduct fertilizer is that it has a higher water resistance than a dispersion of urea in wax containing the same total amount of urea and wax but in which the urea is in the unadducted form.

The aforesaid copending application discloses several methods of preparing a slow release fertilizer comprising a dispersion of a urea-paraffin wax adduct in wax. In one method the solid adduct is preformed after which the preformed adduct is dispersed in molten wax, the resulting dispersion is shaped into fertilizer size particles, and the particles are then allowed to cool below the melting point of the wax. A disadvantage of this technique is that it requires separate steps for forming the adduct and then dispersing the adduct in molten wax. A technique which overcomes this disadvantage involves forming the adduct in situ in the wax. For example, solid urea is dispersed in an amount of molten wax in excess of that required to form an adduct with substantially all the urea (the ratio of urea to paraffin wax in the adduct is 3.16:1, all ratios, percentages, amounts and parts herein being by weight). The dispersion is stirred until the urea therein reacts with some of the molten wax therein to form the adduct, the reaction normally occurring within a few minutes. The reaction mass is the urea-paraffin wax adduct dispersed in the excess wax employed. If the ratio of urea to wax in the original dispersion is greater than 1:1, upon adduction of the urea the entire mass becomes a damp powdery solid having about the texture of wet sand. The reason why the entire mixture becomes solid is apparently due to adsorption of the excess molten wax on the surface of the adduct particles, any unadsorbed wax being insufficient in amount to render the adduct in wax dispersion fluid. A disadvantage of this technique characterized by in situ formation of the adduct is that the particle size of the damp powdery solid is smaller than the 6–40 mesh usually desired for a fertilizer. Although the damp powdery solid can be pelletized by compression molding, extrusion, etc., such techniques entail a separate operation which it would be desirable to eliminate. A particle size of 6–40 mesh means that all the particles pass a 6 mesh sieve and are retained on a 40 mesh sieve, all sieve sizes herein being by U.S. Standard sieves.

A method of preparing a slow release fertilizer in the form of discrete particles each of which comprise a dispersion of a urea-paraffin wax adduct in wax, which method does not have either of the above mentioned disadvantages, has now been found. According to one embodiment of the invention such a fertilizer is prepared by a three-step process which involves (1) Forming discrete slow release fertilizer particles comprising a dispersion of solid, unadducted, urea in solid, low melt point paraffin wax, (2) Aging these particles until a substantial portion of the solid urea therein has reacted with some of the solid wax therein to form a urea-paraffin wax adduct, (3) Holding the aged particles at a temperature in excess of 100° F. until the water resistance of the aged particles has increased.

The particles formed in step 1 above, hereinafter referred to as the urea-wax fertilizer, can be formed in any convenient manner. For example, the low melt point paraffin wax is heated to above its melting point, the urea is added to the molten wax and the mixture is stirred in order to uniformly disperse the urea in the molten wax. Precautions hereinafter described will normally be taken to prevent reaction of the urea and wax to form an adduct in this step of the invention. The resulting dispersion is then shaped into discrete fertilizer size particles comprising a dispersion of solid urea in molten wax by means of a spray nozzle, centrifuge, perforated plate, etc. and the particles thereby obtained are allowed to cool to a temperature below the melting point of the wax. The resulting particles are a dispersion of solid urea in solid wax, substantially all the particles of urea being surrounded by and encased in wax. The pellet forming devices mentioned are some of those conventionially employed for pelletizing urea, ammonium nitrate, etc., hence at least one of these devices will often be available in a conventional fertilizer plant.

The cooling of the discrete particles comprising a dispersion of solid urea in molten wax to a temperature below the melting point of the wax can be effected in any convenient manner, e.g., by allowing the particles to fall through air, but is preferably effected by allowing the particles to fall into a body of water, i.e., by water quenching. Although the reason therefore is not known with certainty the aging step (step 2) in the method of the invention proceeds faster when the particles are cooled by water quenching in step 1 than when other cooling means are employed in the first step.

The particle size of the urea-wax fertilizer is not critical for the present purpose but as mentioned above will usually be 6–40 mesh, more frequently 8–30 mesh. Particles as small as 80 or 100 mesh can be employed if desired, however.

In forming the urea-wax fertilizer it is desirable that the solid urea be of small particle size. The solid urea reacts with some of the wax in the aging step of the method to form an adduct and the rate at which this reaction occurs increases as the urea particle size decreases. Preferably the urea dispersed in the molten wax has a particle size of smaller than 100 mesh, more preferably smaller than 200 mesh.

When the urea employed is smaller than about 100 mesh it tends to agglomerate into lumps which makes it somewhat difficult to form a uniform dispersion of the urea in the wax in conventional agitated mixing vessels. This problem is readily overcome by forming an initial gross dispersion of relatively large size urea, such as commercial crystal urea which is mainly larger than 100 mesh, in the molten wax, and then passing this gross dispersion through a roller mill having a roller clearance sufficiently low to subdivide the urea particles to the desired size. By this technique the particle size of the urea dispersed in the wax is easily reduced to as small as 200 mesh or even 400 mesh. The dispersion discharged from the roller mill is usually a dry solid because the wax has solidified but upon reheating the dispersion the wax melts again.

When urea is dispersed in molten paraffin wax, preparatory to forming small fertilizer particles, the urea and wax often react to form an adduct before the dispersion can be shaped into small particles. The time required for this reaction to take place depends mainly upon the urea particle size. When the urea is larger than 100 mesh adduction may not occur for 15–20 minutes. On the other hand, if the urea is smaller than 100 mesh, say 200 mesh, adduction usually occurs in less than 5 minutes. Since this may not be enough time to form the dispersion into small particles it will usually be desirable to include in the paraffin wax an adduct inhibitor which is effective to prevent or at least substantially delay the adduct reaction. Suitable inhibitors which can be used are wax soluble polymers of vinyl type compounds such as polyethylene, polyisobutylene, copolymer of ethylene and vinylacetate, etc.; wood rosin in any of its various conventional forms; fatty acid nitrogen compounds such as fatty amides, fatty nitriles, etc., fatty amines; alkanol amines such as triethanol amine; wax soluble condensation polymers such as wax soluble alkyd resins; microcrystalline wax; and the like. The amount of inhibitor used to prevent adduction is usually about 1–20%, preferably 3–10%, although higher amounts can also be used. Rosin is the preferred adduct inhibitor. It will be noted subsequently that although the adduct inhibitor prevents the solid urea and molten wax from reacting to form an adduct it does not prevent the solid urea and solid wax in the urea-wax fertilizer from reacting to form an adduct in the aging step of the invention.

It will also be desirable, indeed it is preferable, to incorporate a small amount of asphalt in the molten paraffin wax. When small size, say 200 mesh, urea particles, or any other fertilizer particles, are dispersed in wax the resulting dispersion is very viscous, having a putty-like consistency. This viscous dispersion is difficult to form into small particles by means of a spray nozzle or other pelletizing devices normally available in conventional fertilizer manufacturing facilities. However, if asphalt is present in the wax when the dispersion is formed, the subsequent dispersion is very fluid, having about the fluidity of paint or melted chocolate. The amount of asphalt employed should be 1–20%, more preferably 3–10%, based on the total weight of wax, asphalt, and adduct inhibitor where the latter is used. The type of asphalt employed is not critical but preferably the asphalt is a soft asphalt, i.e., an asphalt having a softening point (ASTM D30–26) in the range of 50°–175° F. and a penetration (ASTM D5–47, 100 gms., 5 sec.) of greater than 20. Although any type of asphalt will fluidize a dispersion of solid urea in molten wax, the ultimate adduct-wax fertilizer particles obtained by the method of the invention have a higher water resistance when a soft asphalt is used than when a hard asphalt (soft. pt. 175°–350° F. and pen. less than 20) is used.

The wax used in forming the urea-wax fertilizer particles should be a low melt point paraffin wax, by which is meant that it has a melting point of 110°–140° F. In the second step of the invention the solid urea in the urea-wax particles reacts with the solid paraffin wax in these particles to form an adduct. This reaction will not occur if the wax in the urea-wax particles is a high melt point paraffin wax (melting point higher than 145° F.) or if it is a microcrystalline wax. Moreover, as has been disclosed in copending application Ser. No. 360,728, filed Apr. 17, 1964, this reaction between solid urea and solid low-melt point paraffin wax can be prevented by incorporating 10–40% high melt point paraffin wax or microcrystalline wax in the low melt point paraffin wax, the percentage being by weight of the resulting wax blend. As mentioned, low melt point paraffin wax has a melting point of 110°–140° F. Preferably the melting point is in the range of 120°–135° F. Such a wax will usually have a penetration of 5–25 dmm. although preferably the penetration is 10–25 dmm. Paraffin wax is distinguished from microcrystalline wax and other types of waxes subsequently.

The relative amounts of urea and wax in the urea-wax particles is best understood in light of the composition of the ultimate fertilizer particles which are a dispersion of adduct in wax. Since the particles are a dispersion of adduct in wax the amount of wax originally employed should be more than that required to form an adduct with the urea originally employed. Since the adduct contains 76% urea this means that the ratio of urea to wax in the urea-wax particles will be less than 3.16:1. Within this requirement the relative amounts of adduct and wax in the adduct-wax particles are not critical because any amount of wax will increase the water resistance of the adduct. The ratio of adduct to wax will be dictated in most cases by soil and climatic conditions. As this ratio increases the fertilizer water resistance decreases. Consequently, in areas of heavy rainfall the ratio of adduct to wax will usually be relatively low while in relatively dry areas this ratio will normally be relatively high. In most cases, however, the amount of adduct will be within certain ranges depending upon the type of slow release fertilizer being prepared. If the fertilizer is to contain only a source of nitrogen, the adduct will be such source and the amount of adduct will normally be a major amount, i.e., over 50%, and the amount of wax will normally be a minor amount, i.e., less than 50%, the percentages being based on the total composition, i.e., adduct plus wax. Since the amount of urea in the adduct is 76%, major and minor amounts of adduct and wax, respectively, are equivalent to employing more than 38 parts urea and less than 62 parts wax originally. In most cases the composition will contain 50–98% adduct, more frequently 60–95%, and 2–50% wax, more frequently 5–40%. By calculation it can be determined that 50–98% adduct and 2–50% wax is equivalent to 38–74.5% urea and 14–73.5% wax in the urea-wax particles. Similarly 60–95% adduct and 5–40% wax is equivalent to 45.5–72% urea and 19.5–63% wax in the urea-wax particles.

It will be desirable in many cases to prepare a complete fertilizer, i.e., a fertilizer containing not only a source of nitrogen but also a source of potassium and phosphorus. In this case the fertilizer will contain not only a urea-paraffin wax adduct as the source of nitrogen but will also contain other conventional fertilizer compounds such as potassium chloride, mono- or diammonium phosphate, potassium nitrate, phosphate, or sulfate, superphosphate, and triple superphosphate. In the case of a complete fertilizer the total amount of fertilizer ingredients in the composition will still normally be a major amount, usually 50–98%, more frequently 60–95%, but the amount of adduct may be relatively small. For example, a 5–15–10 slow release complete fertilizer, i.e., a fertilizer containing 5% nitrogen as N, 15% phosphorus as $P_2O_5$, and 10% potassium as $K_2O$ might contain the following:

| | Percent |
|---|---|
| Urea-paraffin wax adduct | 14.1 |
| Triple superphosphate | 32.6 |
| Potassium sulfate | 18.5 |
| | 65.2 |
| Wax | 34.8 |
| | 100.0 |

Normally the amount of adduct in a fertilizer containing a plurality of essential elements will not be less than 10% by weight of the total composition. Usually it will be at least 20%. Therefore, considering both the case of a nitrogen fertilizer and the case of the fertilizer containing a plurality of essential elements, the amount of adduct will usually be 10–98 parts, more frequently 20–95 parts, and the amount of wax will usually be 2–50 parts, more frequently 5–40 parts. By calculation it can be determined that 10–98 parts adduct and 2–50 parts wax is equivalent to 7.6–74.5 parts urea and 4.4–73.5 parts wax. Similarly 20–95 parts adduct and 5–40 parts wax is equivalent to 15.2–72 parts urea and 9.8–63 parts wax.

If the ultimate fertilizer is to be a dispersion of adduct plus other fertilizer ingredients the urea-wax particles should contain these other fertilizer ingredients in addition to urea. These latter particles can be made in essentially the same manner as described previously. Thus instead of dispersing urea in molten paraffin wax a mixture of urea and the other fertilizer ingredients is dispersed in the molten wax.

The second step of the invention involves aging the urea-wax particles until a substantial amount of the urea therein has reacted with the low melt point paraffin wax therein to form a urea-paraffin wax adduct. Since the reaction will occur on its own at room temperature (77° F.), the aging can be effected by merely allowing the particles to stand at room temperature until most of the urea is in adduct form, the time required for same usually being about 0.1–150 hours, more frequently 6–100 hours. The amount of urea which has adducted can be determined by either X-ray diffraction or differential thermal analysis. The rate at which adduction occurs will depend mainly upon the temperature and humidity of the atmosphere in which the particles are aged. Although the rate is directly proportional to each of these variables, it appears to be influenced more by humidity than by temperature. Preferably the particles are aged in an atmosphere of at least 50%, more preferably 75%, relatively humidity. A satisfactory and preferred method of aging the urea-wax particles involves quickly dipping them into water so as to wet their surface and then placing them into a closed container not much larger than is required to contain the particles. When aged in this manner at room temperature most of the urea will be adducted in about 0.1–80 hours, more frequently 6–50 hours. Although humidity accelerates the aging step it is undesirable to age the particles in contact with liquid water, i.e., submerged in water. One reason for this is that this would leach urea out of the particles during the aging step.

It was mentioned previously that in preparing the urea-wax particles, the particles comprising urea dispersed in molten wax are preferably cooled by water quenching as this reduces the aging time required in the second step. It is believed that in the quenching step some water is trapped within the particle and that this trapped water serves to accelerate the adduct reaction in the aging step.

The aging should be continued until a substantial amount of the urea has reacted to form an adduct. Preferably at least 70% of the urea in the urea-wax particles is adducted, more preferably at least 90%. As mentioned, the amount of adduct can be determined by known techniques. In some cases the amount of adduction which has occurred can be determined visually. If the urea-wax particles contain asphalt they are black in color. Furthermore, they tend to cake so that if a small sample jar is filled with the urea-wax particles an hour or so later most of them are stuck together. As the urea reacts to form an adduct the particles become gray in color and they also become more free flowing. By following these changes in physical properties the extent of adduction can be estimated.

The third step in the method of the invention involves annealing, i.e., heating the aged particles. Although the reason therefore is not known it has been found that the water resistance of the aged particles can be improved by heating them to and holding them at a temperature of at least 100° F. The increase in water resistance and the rate at which it occurs are directly proportional to both the temperature above 100° F. to which the aged particles are heated, i.e., the annealing temperature, and also to the time for which the aged particles are held at this temperature, i.e., the annealing time. There undoubtedly is, of course, a maximum increase in water resistance which cannot be exceeded regardless of temperature or time.

At annealing temperatures below 100° F. the increase in water resistance is insignificant regardless of the annealing time. At temperatures above 100° F. significant increases in water resistance are obtained. As the temperature increases above 100° F. the time required to achieve a given increase in water resistance is reduced. Preferably the annealing temperature is at least 150° F., more preferably at least 170° F. The annealing time will be determined mainly by the annealing temperature but will normally be at least 3 minutes. Preferably the annealing time is at least 10 minutes, more preferably at least 30 minutes.

The maximum annealing temperature which can be used is about 250° F. since the adduct decomposes at this temperature. Of course, if the aged particles contain fertilizer ingredients other than the adduct which decomposes between 100° and 250° F. the annealing temperature should be below such decomposition temperature. The annealing step can be carried out in any convenient manner. For example, the particles are spread out on a tray and placed in an oven. Alternatively, the particles can be tumbled in a tumbler equipped with heating means.

The terms paraffin wax and microcrystalline wax are used herein in accordance with their conventional meanings. Both types of waxes are obtained only from petroleum. Moreover, they are the only types of wax obtainable from petroleum, hence they are referred to generically as petroleum wax. Their differences and similarities are well known to those skilled in the art and are summarized in Bennett, Commercial Waxes, Chemical Publishing Co. (1950), pp. 84–88. Both paraffin and microcrystalline waxes contain mainly saturated paraffin hydrocarbons, the former containing mainly straight chain paraffins while the latter contains a substantial amount of branch chain paraffins. Some typical properties of paraffin and microcrystalline waxes are as follows:

| Property | Paraffin Wax | Microcrystalline Wax |
|---|---|---|
| Molecular Weight | 250–500 | 500–800 |
| Melting Point (ASTM D–127), °F | 110–165 | 140–210 |
| Viscosity at 210° F. (ASTM D–446), SUS | 30–50 | 60–100 |
| Penetration at 77° F. (ASTM D–1321— 100 g., 5 sec.), dmm | 5–25 | 5–25 |

It is apparent from the data shown above that some of the physical properties of the paraffin waxes overlap the normal range of the same property in the microcrystalline waxes. The property which can be used, as is well known, to distinguish paraffin wax from microcrystalline wax is the type of crystals present in each. Paraffin wax has large well-formed crystals while microcrystalline wax contains small irregular crystals and no well-formed crystals of any size. Indeed, microcrystalline wax is sometimes referred to as amorphous. All wax properties herein are by the ASTM tests indicated above.

The invention is specifically illustrated by the following examples.

*Examples*

36 parts of a paraffin wax having a melting point of 129° F., a viscosity at 210° F. of 38 SUS and a penetration at 77° F. of 18 dmm. is charged to a mixing vessel equipped with heating and stirring means. The wax is heated to 240° F. To the wax is added 2 parts of polymerized wood rosin and 2 parts of asphalt. The asphalt has a penetration of 2300 mm. and a softening point of 75° F. The contents of the vessel are stirred until the rosin and asphalt dissolve in the wax. Next 60 parts of commercial crystal urea are added to the wax phase with stirring. This gross dispersion is then passed through a roller mill having a clearance small enough to subdivide any material passing therethrough to about 200 mesh. The discharge from the mill, a granular solid, is heated to 140° F. and thereupon becomes fluid. The fluid dispersion is poured dropwise from a height of about 18″ into a body of water maintained at 50° F. and the resulting solid particles are removed from the water. The solid particles are substantially spherical in shape and have a size of 10–20 mesh, and are wet. A total of about 4000 wet particles obtained in this manner are divided into 8 portions numbered 1–8 containing about 500 wet particles each.

The particles of portion 1 are immediately analyzed for urea-paraffin wax adduct. The amount of adduct present is equivalent to less than 5% of the amount of urea in the particles.

The remaining 7 portions are placed in separate jars after which the jars are closed and placed on a shelf. Twenty-four hours later, during which time the temperature is about 75°–85° F. and the humidity is about 25–50%, the particles of portion 2 are analyzed for adduct. It is found that 88% of the urea originally present in the particles is adducted.

Another 24 hours later, i.e., 48 hours after being placed in the jars, portions 3–8 are analyzed for adduct. In each case more than 95% of the urea in the original particles is adducted. The temperature and humidity during the second 24 hour aging period is essentially the same as during the first 24 hour aging period.

Portions 4–8 are then separately annealed by tumbling in a tumbler at different temperatures and/or different times which are reported in Table I below. The tumbler is a horizontally positioned cylindrical vessel 5″ in diameter and 8″ long having closed ends and which rotates about its longitudinal axis. Four baffles 1″ x 8″ are mounted 90° apart on the inside surface of the vessel parallel to the longitudinal axis of the vessel. The tumbler is equipped with heating and temperature control means.

After tumbling portions 4–8 a ten gram sample of each of portions 3–8 is submerged in water at 77° F. without agitation. After 100 hours the water is removed and analyzed for urea content. Knowing the amount of urea in the original sample (6 gms.) and the amount of urea in the water, the percentage of urea in the fertilizer which is leached out can be calculated. As used herein the term water resistance means water resistance as determined by this procedure.

The data in Table I below show the amount of urea leached out of portions 3–8 after being tumbled at the temperature and for the time shown in the table. Other data, pertinent to portions 1–8, are also shown in the table. In Table II the example numbers correspond to the portion numbers in the above description.

TABLE I

| Example | Hours Aged | Percent Original Urea Adducted at End of Aging Period | Annealing Conditions | | Percent Urea Leached Out in 100 Hrs. |
|---|---|---|---|---|---|
| | | | Temp., °F. | Time, hrs. | |
| 1 | 0 | <5 | | | |
| 2 | 24 | 85 | | | |
| 3 | 48 | 95 | | | |
| 3 | 48 | 95 | (¹) | (¹) | 90 |
| 4 | 48 | 95 | 100 | 120 | 84 |
| 5 | 48 | 95 | 150 | .64 | 40 |
| 6 | 48 | 95 | 180 | ¼ | 26 |
| 7 | 48 | 95 | 180 | ½ | 21 |
| 8 | 48 | 95 | 180 | 1 | 02 |

¹ Not annealed.

By comparing the results of Examples 1–3 it is apparent that aging the particles for 48 hours under the stated conditions of temperature and humidity has resulted in adduction of almost all of the urea in the urea-wax particles.

By comparing the results of Examples 3–8 several conclusions can be drawn. One, the water resistance of the aged particles can be improved by annealing them. Secondly, the improvement in water resistance obtained at an annealing temperature of about 100° F. is significant but relatively small. However, a much larger increase in water resistance can be obtained by annealing at a higher temperature. Thirdly, the annealing time also influences the increase in water resistance obtained.

The invention claimed is:

1. Method which comprises forming solid discrete slow release fertilizer particles comprising a dispersion of solid urea in a solid paraffin wax having a melting point in the range of 110°–140° F., the ratio of said solid urea to said solid paraffin wax being less than 3.16:1, aging said particles until a substantial portion of the urea therein has reacted with the low melt point paraffin wax therein to form a urea-paraffin wax adduct, whereby discreate particles comprising a dispersion of said urea-paraffin wax adduct in wax are obtained, and holding these latter particles at a temperature in excess of 100° F. until the water resistance of said latter particles has increased significantly.

2. Method according to claim 1 wherein said temperature is at least 150° F.

3. Method according to claim 1 wherein said solid paraffin wax contains asphalt and rosin, said asphalt having a softening point in the range of 50°–150° F. and a penetration greater than 20 mm.

4. Method according to claim 3 wherein said temperature is in excess of 150° F.

5. Method according to claim 1 wherein the amount of said solid urea and said solid paraffin wax in the first mentioned dispersion is 7.6–74.5 parts and 4.4–73.5 parts respectively.

6. Method which comprises heating discrete fertilizer particles which comprise a dispersion of a urea-paraffin wax adduct in solid paraffin wax, said particles having been formed by aging discrete particles comprising a dispersion of solid urea in a solid paraffin wax having a melting point of 110°–140° F. until a substantial portion of said solid urea therein has reacted with the solid paraffin wax therein to form a urea-paraffin wax adduct, the ratio of solid urea to solid paraffin wax in the last mentioned discrete particles being less than 3.16:1, said heating being to a temperature of at least 100° F. and being for a time sufficient to significantly improve the water resistance of the first-mentioned discrete fertilizer particles.

7. Method according to claim 6 wherein said heating is to a temperature of at least 150° F.

References Cited by the Examiner

UNITED STATES PATENTS

| | | | |
|---|---|---|---|
| 3,123,637 | 3/1964 | Lard et al. | 71—64 X |
| 3,202,501 | 8/1965 | Petterson et al. | 71—64 X |
| 3,232,740 | 2/1966 | Sor et al. | 71—28 |
| 3,252,786 | 5/1966 | Bozzelli et al. | 71—27 X |

FOREIGN PATENTS 245,105   6/1960   Australia.

OTHER REFERENCES

Hagan, S. M.: Clathrate Inclusion Compounds, Reinhold, New York (1962), pp. 10–14.

DONALL H. SYLVESTER, *Primary Examiner.*

T. D. KILEY, *Assistant Examiner.*